(12) United States Patent
Riedl

(10) Patent No.: US 6,757,549 B2
(45) Date of Patent: Jun. 29, 2004

(54) METHODS AND APPARATUS FOR ADAPTING TRANSMISSION POWER OF A REMOTE WIRELESS DEVICE

(75) Inventor: Wilhelm Ernst Riedl, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 54 days.

(21) Appl. No.: 10/198,481

(22) Filed: Jul. 18, 2002

(65) Prior Publication Data

US 2004/0014481 A1 Jan. 22, 2004

(51) Int. Cl.⁷ .................................................. H04B 7/00
(52) U.S. Cl. ...................... 455/522; 455/69; 455/67.11; 455/67.13; 370/318; 370/329; 379/93.01; 379/93.08; 379/1.03; 379/1.04

(58) Field of Search ........................ 455/522, 69, 67.11, 455/67.13, 70; 370/332, 333, 334, 335, 336, 337, 318, 329; 379/93.01, 93.08, 93.29, 93.34, 1.03, 1.04

(56) References Cited

U.S. PATENT DOCUMENTS 6,285,886 B1 * 9/2001 Kamel et al. ............... 455/522
6,377,813 B1 * 4/2002 Kansakoski et al. ........ 455/522

* cited by examiner

Primary Examiner—William Trost
Assistant Examiner—Danh C Le
(74) Attorney, Agent, or Firm—Joseph S. Tripoli; Harvey D. Fried; Joseph J. Kolodka

(57) ABSTRACT

The transmission power of a wireless device is adapted in response to a determination that errors within a data message are above a threshold level. The data message is simultaneously transmitted with available audio information via a channel supporting audio and non-audio data in respective first and second spectral regions.

16 Claims, 3 Drawing Sheets

METHODS AND APPARATUS FOR ADAPTING TRANSMISSION POWER OF A REMOTE WIRELESS DEVICE

FIELD OF THE INVENTION

The present invention relates generally to analog cordless telephone systems and other various devices, such as intercoms, computers and televisions; and more particularly to devices that are configured to communicate via at least one of a plurality of available radio frequency channels at selective transmission power levels.

DESCRIPTION OF THE RELATED ART

Wireless communications devices such as conventional analog 9 MHz or 2.4 GHz region residential cordless telephone systems necessarily require the use of batteries. Typically, the battery in a handset of a cordless telephone system comprises a rechargeable battery that is recharged when the handset is inserted into an appropriate cradle on a base station. When handset batteries are not recharged with sufficient frequency, the handset batteries are drained to the point where handset operation fails.

SUMMARY OF THE INVENTION

A method and apparatus for adapting the transmission power of a wireless device in response to a determination that errors within a data message are above a threshold level. The data message is simultaneously transmitted with available audio information via a channel supporting audio and non-audio data in respective first and second spectral regions.

In a wireless communications system utilizing a plurality of communications channels, each channel having associated with it a respective carrier frequency for propagating audio data in a first spectral region and non-audio data in a second spectral region, a method according to an embodiment of the invention comprises receiving a data message from a wireless device via the second spectral region of a communications channel, the data message having associated with it a transmission power level; analyzing the data message to determine if the transmission power level is appropriate; and transmitting a data command to the wireless device via the second spectral region of the communications channel, the data command adapted to cause the wireless device to adjust the transmission power level.

BRIEF DESCRIPTION OF THE DRAWINGS

A more complete understanding of the present invention may be obtained from consideration of the following description in conjunction with the drawings, in which.

To facilitate understanding, identical reference numerals have been used, where possible, to designate identical elements that are common to the figures.

DETAILED DESCRIPTION

Figure 1:
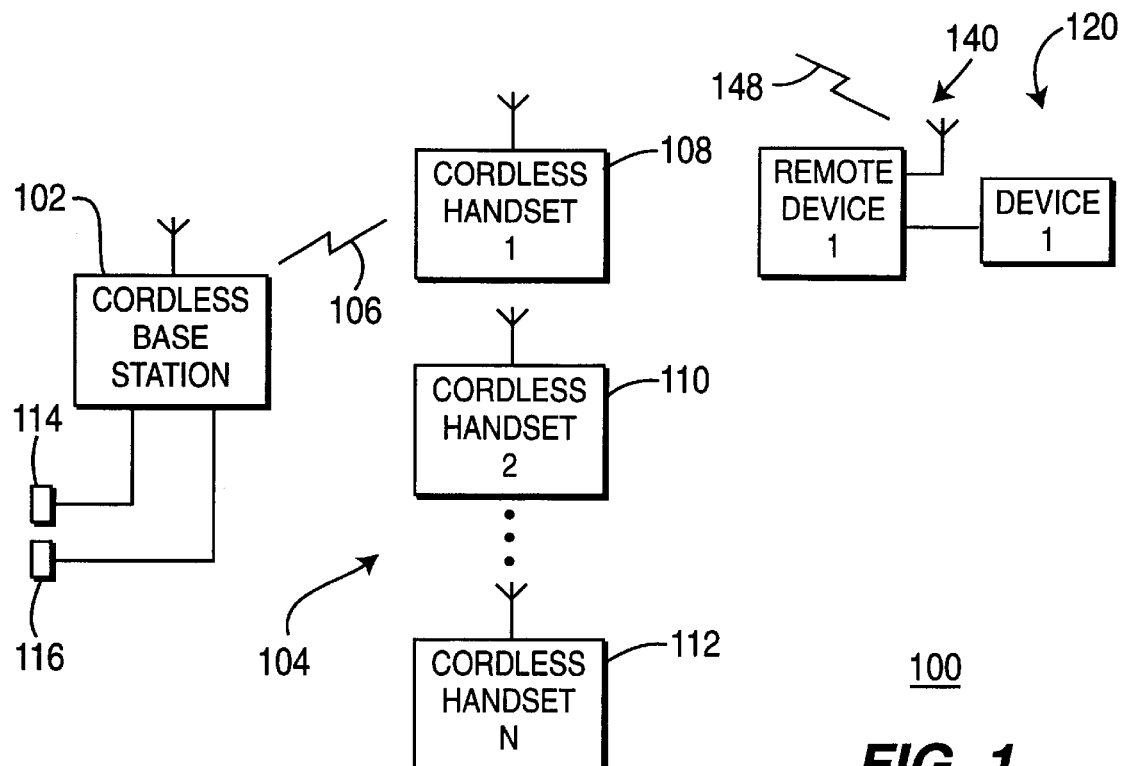
FIG. 1 depicts a high level block diagram of a wireless communication system according to an embodiment of the invention.

FIG. 1 depicts a high level block diagram of a wireless communication system, illustratively a cordless telephone system 100, as well as at least one device 120 and at least one remote wireless device 140. Cordless telephone system 100 includes a cordless base station 102, which may be referred to as a cordless base unit, and a plurality of cordless handsets 104, each of which may be referred to as a cordless telephone unit. The plurality of cordless handsets 104 includes cordless handsets 108–112, designated as cordless handsets 1 through N in FIG. 1.

Cordless telephone system 100 provides for wireless telephone communications within a relatively small geographical area for an end-user. Cordless base station 102 and cordless handset 108 communicate with each other via radio frequency (RF) signals 106. Cordless base station 102 has an interface for coupling to an alternating current (AC) power source 114, such as that commonly provided in a home residence or business. Cordless base station 102 has another interface for coupling to land line 116, which couples cordless base station 102 to the public switched telephone network (PSTN) for land line telephone communication.

Cordless handset 108, which is representative of other cordless handsets 110–112, typically includes a user interface which includes a speaker, a microphone, a display, and a keypad having conventional dual-tone multiple frequency (DTMF) keys for dialing. Cordless base station 102 optionally has the same or similar interface. Thus, cordless base station 102, cordless handset 108, or both devices can be used to make and receive telephone calls.

The remote device 140 and device 120 may comprise any device compatible with cordless telephone system 100. The device 120 may comprise devices such as an intercom installed in a home residence or business, a computer such as a personal computer (PC) or laptop (with or without browser software for the Internet or WWW), an AM/FM radio (including its associated tape and CD players) and its remote controllers, a television and its remote controllers, a video camera recorder (VCR) and its remote controllers, and sensors such as temperature sensors, weather sensors, and motion detection sensors. Although devices 120 and remote wireless devices 140 are shown as separate devices in FIG. 2, they may be integrated into a single device and/or housing, such as a remote wireless intercom.

A more detailed and expanded explanation of the wireless communication system 100 of FIG. 1 including Data over Voice (DoV) hardware is provided within commonly-assigned U.S. patent application Ser. No. 10/007242, which was filed on Nov. 10, 2001 and entitled "METHODS AND APPARATUS FOR COMMUNICATION INFORMATION FROM A REMOTE WIRELESS DEVICE TO A CORDLESS TELEPHONE SYSTEM," which patent application is incorporated herein by reference in its entirety. The disclosed methods and apparatus in this patent application relate to a wireless communication system enabling, for example, a cordless telephone system to communicate with a plurality of other devices, such as intercoms, computers, televisions and the like.

The wireless communication system 100 of FIG. 1 utilizes the concurrent or simultaneous transmission of audio or voice information and non-audio or non-voice information. Specifically, within the context of this disclosure, voice or audio information comprises band-limited analog audio information modulated onto a radio frequency (RF) carrier signal in a first spectral region relative to the carrier signal. Non-audio information comprises, illustratively, an encoded data signal that is modulated onto the carrier frequency in a second spectral region relative to the carrier signal.

In one embodiment of the invention, voice or audio information is carried in a first spectral region of approximately 0 to 4 KHz from a carrier frequency $f_C$, while non-audio data is carried in a second spectral region having a 1 KHz bandwidth and offset from the carrier frequency $f_C$ by approximately 10 KHz. Other spectral allocations may be employed with the context of the present invention. Moreover, while analog audio information may be readily modulated onto a carrier frequency and, therefore, simply transported within the first spectral region, it is also contemplated by the inventors that data may be transported within the first spectral region (or a reduced first spectral region) while audio information may be transported within the second spectral region (or an expanded second spectral region).

Within the context of the wireless communication system 100 of FIG. 1, the subject invention utilizes degradations within the non-audio information transported via the second spectral region to determine whether channel impairments or other anomalies likely impinge upon or otherwise reduce the fidelity of the audio or voice information carried within the first spectral region. Transmission power levels are adjusted in response to such degradation.

Figure 2:
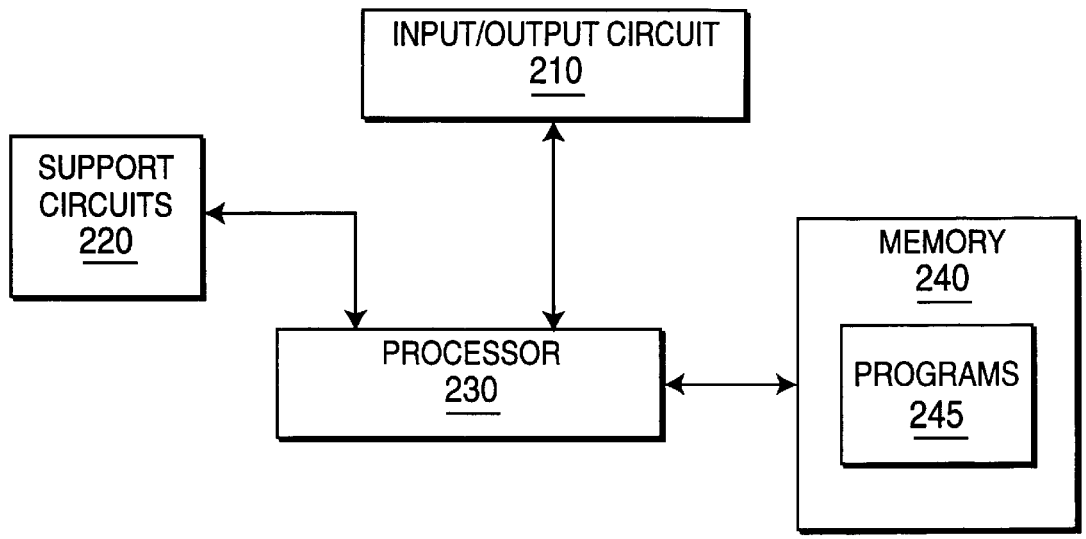
FIG. 2 depicts a high level block diagram of an exemplary controller suitable for use in the system of FIG. 1.

FIG. 2 depicts a block of an exemplary controller suitable for use in the system of FIG. 1. Specifically, the exemplary controller 200 in FIG. 2 comprises a processor 230 as well as memory 240 for storing various programs 245. The processor 230 cooperates with conventional support circuitry 220 such as power supplies, clock circuits, cache memory and the like as well as circuits that assist in executing a software routine stored in the memory 240. As such, it is contemplated that some of the process steps discussed herein as software processes may be implemented within hardware, for example, as circuitry that cooperates with the processor 230 to perform various steps. The controller 200 also contains input/output (I/O) circuitry 210 that forms an interface between the various functional elements communicating with the controller 200. For example, in an embodiment of the cordless base station 102 of FIG. 1 discussed below with respect to FIG. 3, the controller 200 of FIG. 2 is utilized as a controller 302 of FIG. 3, which controller 302 is coupled to display circuitry 308, keypad circuitry 310, a transmitter 318 and other circuitry via the I/O circuit 210. More generally, the controller 200 of FIG. 2 may be advantageously employed as any controller element discussed herein.

Figure 3:
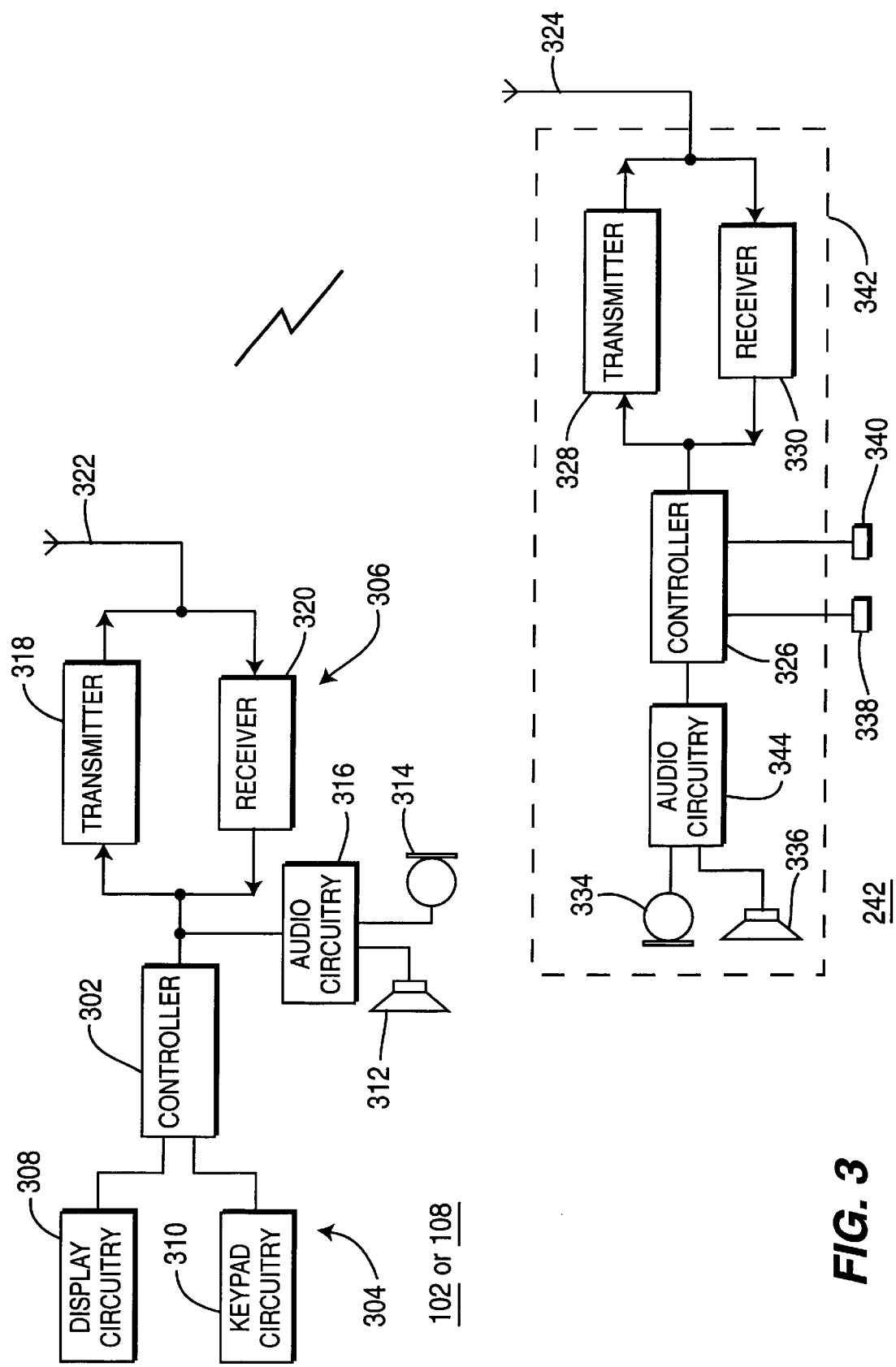
FIG. 3 depicts a high level block diagram of a wireless communications device such as a base station or hand set suitable for use in the wireless communication system of FIG. 1.

FIG. 3 depicts a high level block diagram of apparatus suitable for use as any of cordless base station 102, cordless handset 108 or remote wireless device 140 of FIG. 1. The schematic block diagram is illustrated for either cordless base station 102 or cordless handset 108 since similar components exist in each device. In the following description, the schematic diagram of FIG. 3 will be referred to as illustrating cordless handset 108.

As shown, cordless handset 108 of FIG. 3 includes electrical components such as a controller 302, user interface circuitry 304, and transceiver circuitry 306. User interface circuitry 304 includes display circuitry 308 for use in connection with a visual display such as a Liquid Crystal Display (LCD), keypad circuitry 310 for use in connection with a keypad, and audio circuitry 316 for use in connection with a speaker 312 and a microphone 314. Transceiver circuitry 306 includes a transmitter 318, a receiver 320, and an antenna 322. Transceiver circuitry 306 uses RF techniques for communication and, in particular, frequency modulation (FM) techniques. Preferably, transceiver circuitry 306 utilize FM techniques in the 900 MHz or 2.4 GHz Industrial, Scientific, and Medical (ISM) bands. Alternatively, transceiver circuitry 306 may utilize other well-known communication techniques, such as Time Division Multiple Access (TDMA) or Code Division Multiple Access (CDMA) communication schemes.

Basic operation of cordless handset 108 of FIG. 3 is now described. When an end-user of cordless handset 108 is engaged in a telephone call, the end-user speaks or conveys audible voice signals into microphone 314 which provides low-level analog signals to audio circuitry 316 for processing the information. This information is conveyed to transmitter 318 and transmitted through antenna 322 via RF signals to cordless base station 102 (FIG. 1). On the other hand, cordless handset 108 of FIG. 3 receives RF signals from cordless base station 102 (FIG. 1) through antenna 322 and receiver 320 which processes them and provides them to audio circuitry 316. Audio circuitry 316 processes these signals and provides them to speaker 312, which generates audible voice signals for the end-user. Controller 302 provides general control over transmitter 318, receiver 320, and audio circuitry 316 as needed.

The keypad which is used with keypad circuitry 310 typically includes conventional telephone keys (i.e., dual-tone multiple frequency or DTMF keys 0–9, *, and #) as well as control keys. The end-user initiates telephone calls by pressing the keys of the keypad, where keypad circuitry 310 uniquely detects each key that is pressed and provides this information to controller 302. Controller 302 then passes this DTMF key selection data to transmitter 318 in suitable form so that it can be transmitted from antenna 322 to cordless base station 102 (FIG. 1). In response, cordless base station 102 (FIG. 1) generates DTMF tones based on the DTMF key selection data for originating the telephone call. The keypad is used for other reasons as well, such as for changing the channel that cordless base station 102 and handset 108 use for communications.

The visual display (e.g., LCD) which is used with display circuitry 308 confirms the identification of the keys that were pressed by visually displaying them upon actuation. The visual display also displays other useful information to the end-user, such as caller identification (ID) information, the current date and time, as well as the current channel number. The caller ID information is transmitted to cordless handset 208 from cordless base station 102 (FIG. 1) when a telephone call over the PSTN is received. Controller 302 receives such data from receiver 320 and passes it in suitable form to display circuitry 308 for display.

Figure 4:
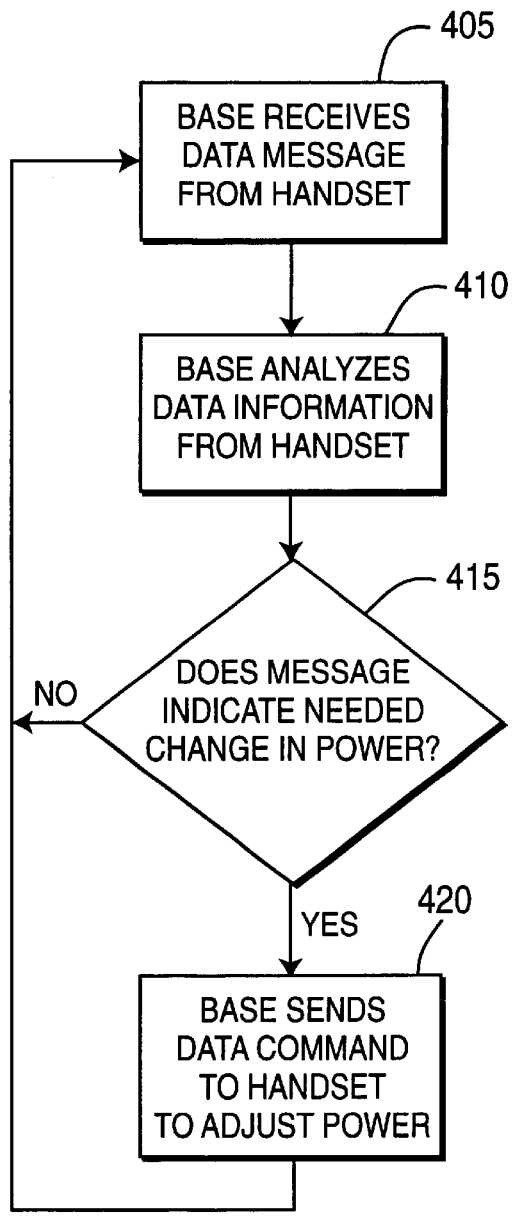
FIG. 4 depicts a flow diagram of a method according to the invention and suitable for use in a base station.
Figure 5:
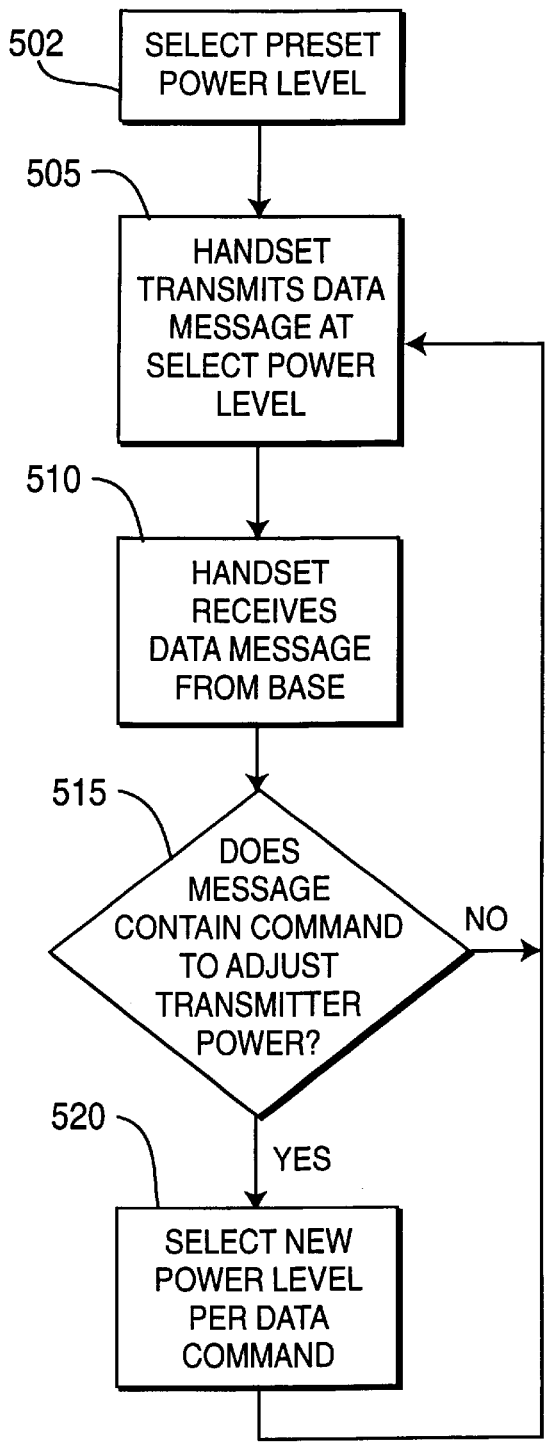
FIG. 5 depicts a flow diagram of a method according to the invention and suitable for use in a handset or mobile device.

Within the context of the present invention, the simultaneous transmission of audio and non-audio information by the first and second spectral regions of a carrier frequency forms a single communication channel between, for example, the base station 102 and a cordless handset 108 (or remote device 140/120). Within the context of the wireless communication system 100 of FIG. 1, a plurality of such communications channels are utilized, each communication channel having associated with it a carrier frequency $F_c$ for propagating the audio and non-audio information within the respective first and second spectral regions. The embodiment of the invention discussed below with respect to FIGS. 4 and 5 are discussed within the context of base station communications with a cordless handset. However, any wireless communications system utilizing a plurality of channels including first and second spectral regions for carrying audio and non-audio data.

FIG. 4 depicts a flow diagram of a method according to the invention and suitable for use in a base station. Specifically, the method 400 comprises those steps performed by a base station in one embodiment of the invention to cause a handset or mobile device to reduce its transmission power.

The method 400 of FIG. 4 is entered at step 405, where a base station receives a data message from a handset or other wireless communication device. The data message is transmitted within the second spectral region of a communications channel facilitating communications between the base station and a desired wireless communication device. In one embodiment of the invention, the data message is sent by the wireless communication device at periodic intervals. The periodic intervals may include times during which the wireless communication device is actively receiving and transmitting audio input from a user, and/or times when the wireless communication device is inactive or in "standby" mode.

At step 410, the base station analyzes data information received from the handset. That is, as previously discussed, the communication channel comprises a radio frequency (RF) carrier signal having modulated thereon audio information within a first spectral region and data within a second spectral region. Thus, at step 410, the data information included within the second spectral region is analyzed by the base station to determine whether signal strength is appropriate, whether errors exist and the like.

At step 415, a query is made as to whether the analysis of step 410 indicates that a change in transmission power of the handset or wireless device is appropriate. If no change in power is appropriate, then the method 400 proceeds to step 405. Otherwise, at step 420 the base station sends a data command to the handset or wireless device adapted to cause the handset or wireless device to adjust its transmission power. After executing step 420, the method 400 proceeds to step 405.

In one embodiment of the invention, the method 400 of FIG. 4 is adapted to cause the handset or wireless device to transmit at a minimum power level necessary to achieve a data error rate below a threshold level. This threshold level is preferably selected to correspond to a minimal acceptable fidelity level of audio information transmitted within the first spectral region of the transmission channel. Thus, the data command sent to the handset at step 420 indicates that the transmission power level should be reduced or increased, in absolute terms or incrementally. An absolute reduction or increase in power comprises the base unit determining an amount by which the transmission power should be reduced or increased, and providing this determination to the handset or wireless device in the data command. The incremental reduction or increase in power comprises the base station simply determining that power should be reduced or increased by some amount, and the handset or wireless device responsively reducing or increasing transmission power by a predetermined amount.

FIG. 5 depicts a flow diagram of a method according to the invention and suitable for use in a handset or mobile device such as depicted above with respect to FIG. 1. The method 500 of FIG. 5 is entered at step 502, where a preset power level or initial power level is selected. At step 505, where the handset transmits a data message at the selected power level. As previously noted, the data message is transmitted within the second or non-audio spectral region of the communications channel. At step 510, the handset receives a data message from the base station. At step 515, a query is made as to whether the data message received from the base station at step 510 contains a data command to adjust transmission power. If a transmission power adjustment command is not included within the message, then the method 500 proceeds to step 505. Otherwise, the method 500 proceeds to step 520.

At step 520, the handset changes the transmission power level in response to the transmission power adjustment command. In response to an absolute power adjustment command, the power level of the handset is incremented or decremented by the amount included within the data command. In the case of a relative power adjustment command, the power level is incremented or decremented by a predetermined amount. At step 520, a new power level is selected per the power adjustment command, and the method 500 proceeds to step 505.

The above-described figures advantageously provide for the increase or decrease in transmission power utilized by a remote unit (e.g., a handset) within a wireless communications system, thereby providing a mechanism to conserve battery power in the remote device. While the invention has been primarily described within the context of specific Data over Voice (DoV) hardware, the invention may be utilized within any communications system in which a data channel including transmission power indicative information is used. Thus, the invention advantageously enables channel selection in a communications device in a manner that tends to avoid disturbing an existing voice conversation.

Although various embodiments which incorporate the teachings of the present invention have been shown and described in detail herein, those skilled in the art can readily devise many other varied embodiments that will still incorporate these teachings.

What is claimed:

1. A mobile communications terminal, comprising:
    a transmitter for simultaneously transmitting voice and data in respective spectral regions for receipt at a base station, the data for use by the base station in identifying degradations, if any, within the data and in determining whether at least one of channel impairments and other anomalies indicated by the identified degradations have a potential to undesirably affect the voice transmitted by the transmitter;
    a receiver for receiving at least one signal from the base station in response to the identified degradations within the data transmitted by the transmitter; and
    means responsive to said at least one base station signal for adjusting a power level of the transmitter responsive to the identified degradations within the data transmitted by the transmitter.

2. The terminal of claim 1, wherein said power level is adapted by a predefined amount in response to said base station signal.

3. The terminal of claim 1, wherein said power level of said transmitter is adapted according to an amount specified within said base station signal.

4. A computer readable medium for storing software instructions that, when executed by a processor, performs the steps of:
    receiving a data message from a wireless device, communicated via a communications channel having associated with it a respective carrier frequency for propagating audio data in a first spectral region and non-audio data in a second spectral region, said data message received via said second spectral region and having associated with it a transmission power level;

analyzing said data message to identify degradations, if any, within the data message and to determine whether at least one of channel impairments and other anomalies indicated by the identified degradations have a potential to undesirably affect the audio data transmitted from the wireless device via the first spectral region of said communications channel; and transmitting a data command to said wireless device via the second spectral region of said communications channel, said data command adapted to cause said wireless device to adjust said transmission power level.

5. A cordless telephone system, comprising:

a handset transmitter for simultaneously transmitting voice and data in respective spectral regions:

a base station for receiving the voice and data transmitted by the handset transmitter, for identifying degradations, if any, within the data transmitted by said handset transmitter, for determining whether at least one of channel impairments and other anomalies indicated by the identified degradations have a potential to undesirably affect the voice transmitted by said handset transmitter, and for transmitting at least one transmission power adjustment command in response to the identified degradations, the at least one transmission power adjustment command for effecting a change in a transmission power level of the handset transmitter;

a handset receiver for receiving the at least one transmission power adjustment command; and means responsive to the at least one transmission power adjustment command for adjusting the transmission power level of the handset transmitter.

6. A method for wireless communication, comprising the steps of:

simultaneously transmitting voice and data in respective spectral regions for receipt at a base station, the data for use by the base station in identifying degradations, if any, within the data and in determining whether at least one of channel impairments and other anomalies indicated by the identified degradations have a potential to undesirably affect the voice transmitted by the transmitter;

receiving at least one signal from the base station in response to the identified degradations within the data transmitted by the transmitter; and adjusting a power level of the transmitter responsive to the identified degradations within the data transmitted by the transmitter.

7. A base station for a cordless telephone system having a mobile terminal, comprising:

a receiver for simultaneously receiving voice and data transmitted in respective spectral regions from the mobile terminal;

a controller for identifying degradations, if any, within the data, for determining whether at least one of channel impairments and other anomalies indicated by the identified degradations have a potential to undesirably affect the voice transmitted by the mobile terminal, and for generating at least one transmission power adjustment command in response to the identified degradations, the at least one transmission power adjustment command for effecting a change in a transmission power level of the mobile terminal; and a transmitter for at least transmitting the at least one transmission power adjustment command to the mobile terminal.

8. The base station of claim 7, wherein the at least one transmission power adjustment command is adapted to cause the mobile terminal to decrease said transmission power level by a predetermined amount.

9. The base station of claim 7, wherein said controller identifies the degradations by determining whether the data includes errors above a threshold level, and in case of errors above the threshold level, the at least one transmission power adjustment command generated by said controller is adapted to cause the mobile terminal to increase the transmission power level thereof by a predefined amount.

10. The base station of claim 7, wherein said controller identifies the degradations by determining whether the data includes errors above a threshold level, and in case of errors above the threshold level, the at least one transmission power adjustment command generated by said controller is adapted to cause the mobile terminal to increase the transmission power level thereof by an amount calculated to avoid the errors above the threshold level.

11. The base station of claim 7, wherein the data is specifically constructed for the sole purpose of determining whether the at least one of channel impairments and other anomalies indicated by the identified degradations have the potential to undesirably affect the voice transmitted by the mobile terminal.

12. A method for wireless communication, comprising the steps of:

simultaneously receiving voice and data transmitted in respective spectral regions from a mobile terminal;

identifying degradations, if any, within the data, and determining whether at least one of channel impairments and other anomalies indicated by the identified degradations have a potential to undesirably affect the voice transmitted from the mobile terminal in a corresponding one of the respective spectral regions;

generating at least one transmission power adjustment command in response to the identified degradations, the at least one transmission power adjustment command for effecting a change in a transmission power level of the mobile terminal; and transmitting the at least one transmission power adjustment command to the mobile terminal.

13. The method of claim 12, wherein the at least one transmission power adjustment command is adapted to cause the mobile terminal to decrease the transmission power level by a predetermined amount.

14. The method of claim 12, wherein said determining step comprises the step of determining whether the data includes errors above a threshold level, and in case of errors above the threshold level, the at least one transmission power adjustment command is adapted to cause the mobile terminal to increase the transmission power level thereof by a predefined amount.

15. The method of claim 12, wherein said determining step comprises the step of determining whether the data includes errors above a threshold level, and in case of errors above the threshold level, the at least one transmission power adjustment command is adapted to cause the mobile terminal to increase the transmission power level thereof by an amount calculated to avoid the errors above the threshold level.

16. The base station of claim 12, wherein the data is specifically constructed for the sole purpose of determining whether the at least one of channel impairments and other anomalies indicated by the identified degradations have the potential to undesirably affect the voice transmitted from the mobile terminal in the corresponding one of the respective spectral regions.

* * * * *